US012626217B2

(12) United States Patent
Singh

(10) Patent No.: US 12,626,217 B2
(45) Date of Patent: May 12, 2026

(54) AUTOMATIC INVENTORY MONITORING AND SEARCH SYSTEM

(71) Applicant: Seeonic LLC, Minneapolis, MN (US)

(72) Inventor: Nicholas F. Singh, Maple Grove, MN (US)

(73) Assignee: Seeonic LLC, Minneapolis, MN (US)

( * ) Notice: Subject to any disclaimer, the term of this patent is extended or adjusted under 35 U.S.C. 154(b) by 230 days.

(21) Appl. No.: 18/301,142

(22) Filed: Apr. 14, 2023

(65) Prior Publication Data

US 2023/0334420 A1 Oct. 19, 2023

Related U.S. Application Data

(60) Provisional application No. 63/330,969, filed on Apr. 14, 2022.

(51) Int. Cl.
*G06Q 10/087* (2023.01)
*G06Q 30/0601* (2023.01)

(52) U.S. Cl.
CPC ....... *G06Q 10/087* (2013.01); *G06Q 30/0639* (2013.01)

(58) Field of Classification Search
CPC .......................... G06Q 10/087; G06Q 30/0639
USPC .......................................................... 705/28
See application file for complete search history.

(56) References Cited

U.S. PATENT DOCUMENTS

| | | | |
|---|---|---|---|
| 4,636,950 A | 1/1987 | Caswell et al. | |
| 5,565,858 A | 10/1996 | Guthrie et al. | |
| 5,920,261 A | 7/1999 | Hughes et al. | |
| 6,563,417 B1 | 5/2003 | Shaw | |
| 7,152,040 B1 | 12/2006 | Hawthorne et al. | |
| 7,654,456 B2 | 2/2010 | Roewer | |
| 8,319,607 B2 | 11/2012 | Grimlund et al. | |
| 10,489,741 B1 * | 11/2019 | Nigro | G06K 7/10475 |
| 10,997,554 B1 * | 5/2021 | McMaster | G06Q 30/0635 |
| 11,279,559 B1 * | 3/2022 | Montgomery | G06Q 10/0875 |
| 2002/0087436 A1 | 7/2002 | Guthrie et al. | |
| 2003/0115096 A1 | 6/2003 | Reynolds et al. | |
| 2005/0060246 A1 | 3/2005 | Lastinger et al. | |
| 2005/0088299 A1 | 4/2005 | Bandy et al. | |
| 2005/0253704 A1 | 11/2005 | Neuwirth | |
| 2006/0022815 A1 | 2/2006 | Fischer et al. | |
| 2006/0232412 A1 | 10/2006 | Tabacman et al. | |
| 2006/0267733 A1 | 11/2006 | Steinke et al. | |

(Continued)

FOREIGN PATENT DOCUMENTS

EP 3640835 A1 * 4/2020 ........... H01Q 1/2208

OTHER PUBLICATIONS

PCT Searching Authority; International Search Report and Written Opinion for PCT/US23/65818 mailed Oct. 10, 2023, 10 pages.

(Continued)

*Primary Examiner* — Russell S Glass

(74) *Attorney, Agent, or Firm* — Merchant & Gould P.C.

(57) ABSTRACT

In general terms, this disclosure is directed to automatic inventory monitoring and interfacing an inventorying monitoring system with a search system. In some embodiments, and by non-limiting example, the automatic inventory monitoring system monitoring the presence of a product having a product identification tag associated therewith. In some embodiments, the search system provides search results based at least in part on data collected by the automatic inventory monitoring system.

9 Claims, 11 Drawing Sheets

(56)  References Cited

U.S. PATENT DOCUMENTS

| | | | | |
|---|---|---|---|---|
| 2006/0284727 | A1 | 12/2006 | Steinke | |
| 2007/0018820 | A1 | 1/2007 | Chand et al. | |
| 2007/0024436 | A1 | 2/2007 | Bandy | |
| 2007/0035380 | A1 | 2/2007 | Overhultz et al. | |
| 2007/0124216 | A1 | 5/2007 | Lucas | |
| 2007/0145130 | A1 | 6/2007 | Danilewitz | |
| 2007/0236336 | A1 | 10/2007 | Borcherding | |
| 2007/0267473 | A1 | 11/2007 | Thayer | |
| 2008/0068173 | A1 | 3/2008 | Alexis et al. | |
| 2008/0079577 | A1 | 4/2008 | Malik | |
| 2008/0129509 | A1 | 6/2008 | Duron | |
| 2008/0186174 | A1 | 8/2008 | Alexis et al. | |
| 2008/0314980 | A1 | 12/2008 | Folcke et al. | |
| 2011/0181597 | A1* | 7/2011 | Cardno | G06Q 40/04 |
| | | | | 345/440 |
| 2012/0271742 | A1 | 10/2012 | Solomon | |
| 2017/0228688 | A1 | 8/2017 | Bourlon | |
| 2019/0147523 | A1* | 5/2019 | Shastry | G06Q 30/0631 |
| | | | | 705/26.81 |
| 2022/0004722 | A1* | 1/2022 | Teshirogi | G06K 7/10881 |

OTHER PUBLICATIONS

European Patent Office, Supplementary European Search Report for Application No. 08828568.9 mailed on Jun. 8, 2012, 7 pages.
State Intellectual Property Office of the People's Republic of China, First Office Action for Application No. 200880107331.8, mailed on Jul. 2, 2012, 9 pages.

* cited by examiner

114

124

128

160

Active Cloud Comm

LTE-M / NB-IoT / LoRa
with Geolocation

Ultra-low Power
Sync Trigger
Controller

RTC/Calendar

XBee-Compatible

DATA

WAKE

GPIO

+3V

122

126

Memory 154

Processor 150

148

Sensors 155

Temp | Humid | Light | 3-Axis Accel

Ultra-low Power
Async Trigger
Controller

Molex

DATA
WAKE
GPIO
BATT

142 | 156 | 157 | 158 | 159

Short/Mid-Range Comm

RFID | NFC

170

Plug-In
Expansion

USB

DATA
+5V

146

144

145

WiFi/BLE/GPS

450

Receive product identification information
452

Monitor inventory of the products
454

Determines a location of the inventory
456

Sends inventory information to the search system
458

Figure 7:
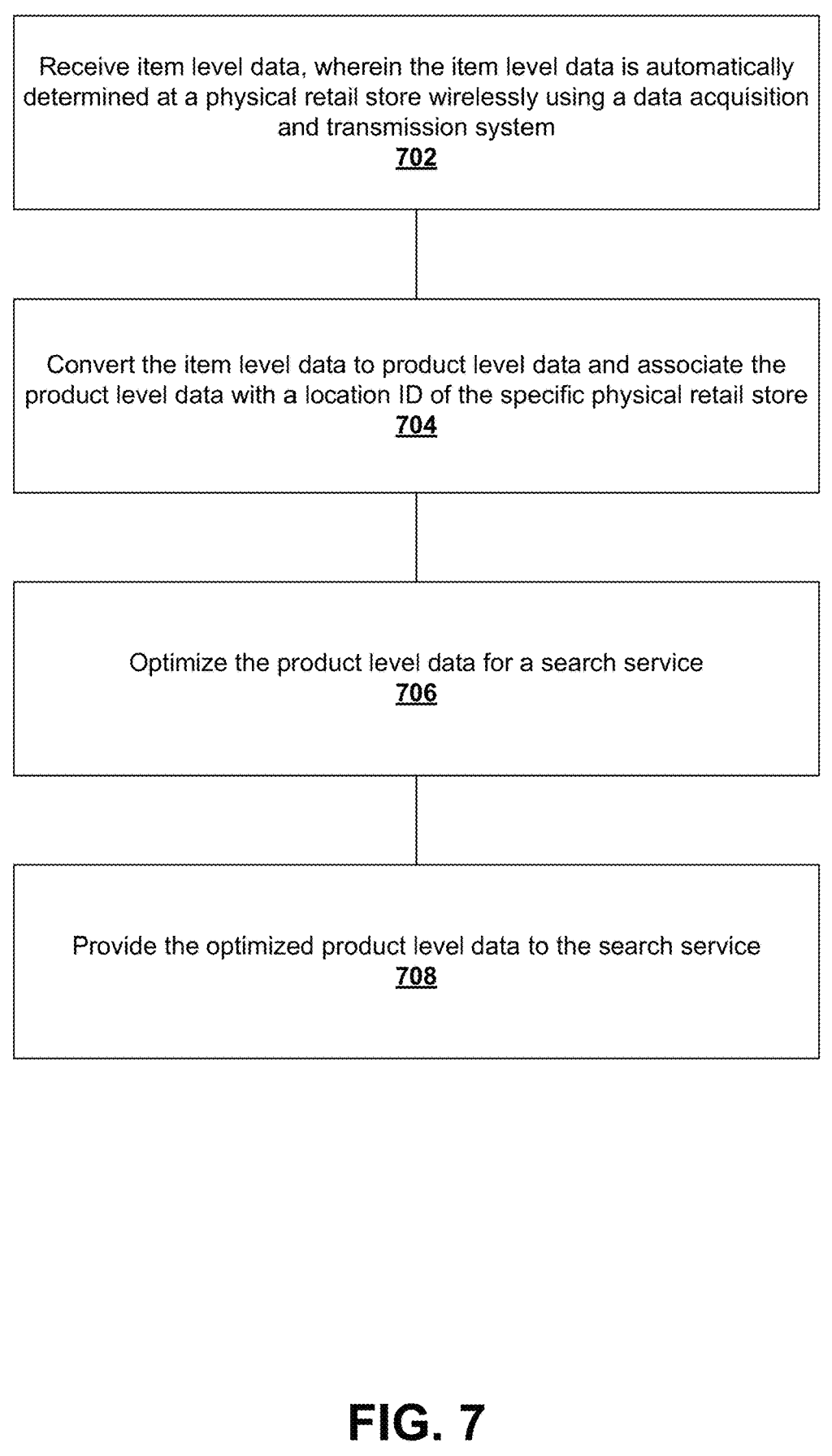

Receive item level data, wherein the item level data is automatically determined at a physical retail store wirelessly using a data acquisition and transmission system
702

Convert the item level data to product level data and associate the product level data with a location ID of the specific physical retail store
704

Optimize the product level data for a search service
706

Provide the optimized product level data to the search service
708

1100 https://www.brand.com/productA

Buy Online:

Product A

Image

Price: $9.00
Typically Ships in 2 days

Add to Cart

Find it in store:

Maps:

Store 1
$10.00
Address
3 Left

Store 2
$10.99
Address
143 Left

Store 3
$9.99
Address
25 Left

1102

1104

AUTOMATIC INVENTORY MONITORING AND SEARCH SYSTEM

CROSS-REFERENCE TO RELATED APPLICATION

This application claims priority to U.S. Provisional Patent Application No. 63/330,969, filed Apr. 14, 2022, the disclosure of which is hereby incorporated by reference in its entirety.

BACKGROUND

Inventory management is a difficult task for businesses that stock physical inventory. The dynamic nature of retail environments, characterized by frequent product movement, varying customer demands, and the need to restock shelves, can make it difficult for retailers to track inventory levels accurately and in real-time (or near real-time). Inaccurate inventory information may lead to lost sales opportunities, dissatisfied customers, and inefficiencies in store operations.

Search platforms, such as Google, Bing, and Yahoo, are important tools for helping users find relevant information including information related to products and services. The search platforms process search queries and presenting them with a list of search results. These search results often include links to websites, news articles, images, videos, and other types of content related to the query. It is common for users interested in purchasing an item to being the shopping process by providing a related query to a search platform. Traditional retail integrations with search platforms typically are focused on retailers with a large online presences and e-commerce websites.

SUMMARY

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

In general terms, this disclosure is directed to automatic inventory monitoring and interfacing an inventorying monitoring system with a search system. In some embodiments, and by non-limiting example, the automatic inventory monitoring system monitoring the presence of a product having a product identification tag associated therewith. In some embodiments, a search system provides search results based at least in part on the inventory data collected by the automatic inventory monitoring system.

One aspect is an automatic inventory monitoring and search system for monitoring presence of a product having a product identification tag associated therewith, wherein the product identification tag contains product identification information, wherein the automatic inventory monitoring and search system comprises a first data acquisition and transmission device arranged and configured to be coupled to a product storage structure for storing products thereon, the first data acquisition and transmission device comprising a controller, a wireless tag reader operably communicating with the controller, and a wireless communications unit operably communicating with the controller, wherein the wireless communications unit transmits the product identification information via a wireless communication network, a data evaluation system configured to receive the product identification information from the wireless communications unit of the first data acquisition and transmission device, monitor inventory of the products at the product storage structure, and determine a location of the inventory of the products including but not limited to via geographic identification or business identification, and a search system configured to connect to the data evaluation system, receive the inventory of the products at the location, receive electronic input from a user computing device, and provide information about the inventory of the products at the location of the products to the user computing device based upon electronic input.

Another aspect is an inventory monitoring system comprising at least one processor and at least one memory storing instructions which, when executed by the at least one processor cause the inventory monitoring system to receive product identification information for products at a retail store from a data acquisition and transmission system, wherein the data acquisition and transmission system includes one or more wireless tag readers configured to detect the product identification information from a product identification tag associated with a product, monitor inventory of the products based on the received product identification information, determine a location of the inventory, and send the inventory of the products at the location of the products to a search system to allow the search system to provide information about the inventory of the products at the location of the products to a user device in response to a search request.

Yet another aspect is a method of providing inventory data to a search service, the method comprising receiving product identification information for products at a retail store from a data acquisition and transmission system, wherein the data acquisition and transmission system includes one or more wireless tag readers configured to detect the product identification information from a product identification tag associated with a product, monitoring inventory of the products based on the received product identification information, determine a location of the inventory including but not limited to via geographic identification or business identification, and sending inventory information, including the inventory of the products at the location of the products, to a search system to allow the search system to provide information about the inventory of the products at the location of the products to a user device in response to a search request.

BRIEF DESCRIPTION OF THE DRAWINGS

FIG. 7 illustrates an example method for integrating automatically inventorying monitoring with a search system, in accordance with some embodiments of the present disclosure.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general terms, this disclosure is directed to automatic inventory monitoring and interfacing an inventorying monitoring system with a search system. In some embodiments, and by non-limiting example, the automatic inventory monitoring system monitoring the presence of a product having a product identification tag associated therewith. In some embodiments, the search system provides search results based at least in part on data collected by the automatic inventory monitoring system.

In some embodiments, a user enters a search query for an item and a search system provides information about a physical retail store having available inventory of the item. For example, a user may send a search query with the text: "where to buy flip flops near me." The search system may know or determine location information of the user and search for physical retail stores which have inventory of the item. The automatic inventory monitoring systems ensure the search system receives accurate and timely inventory information.

Figure 1:
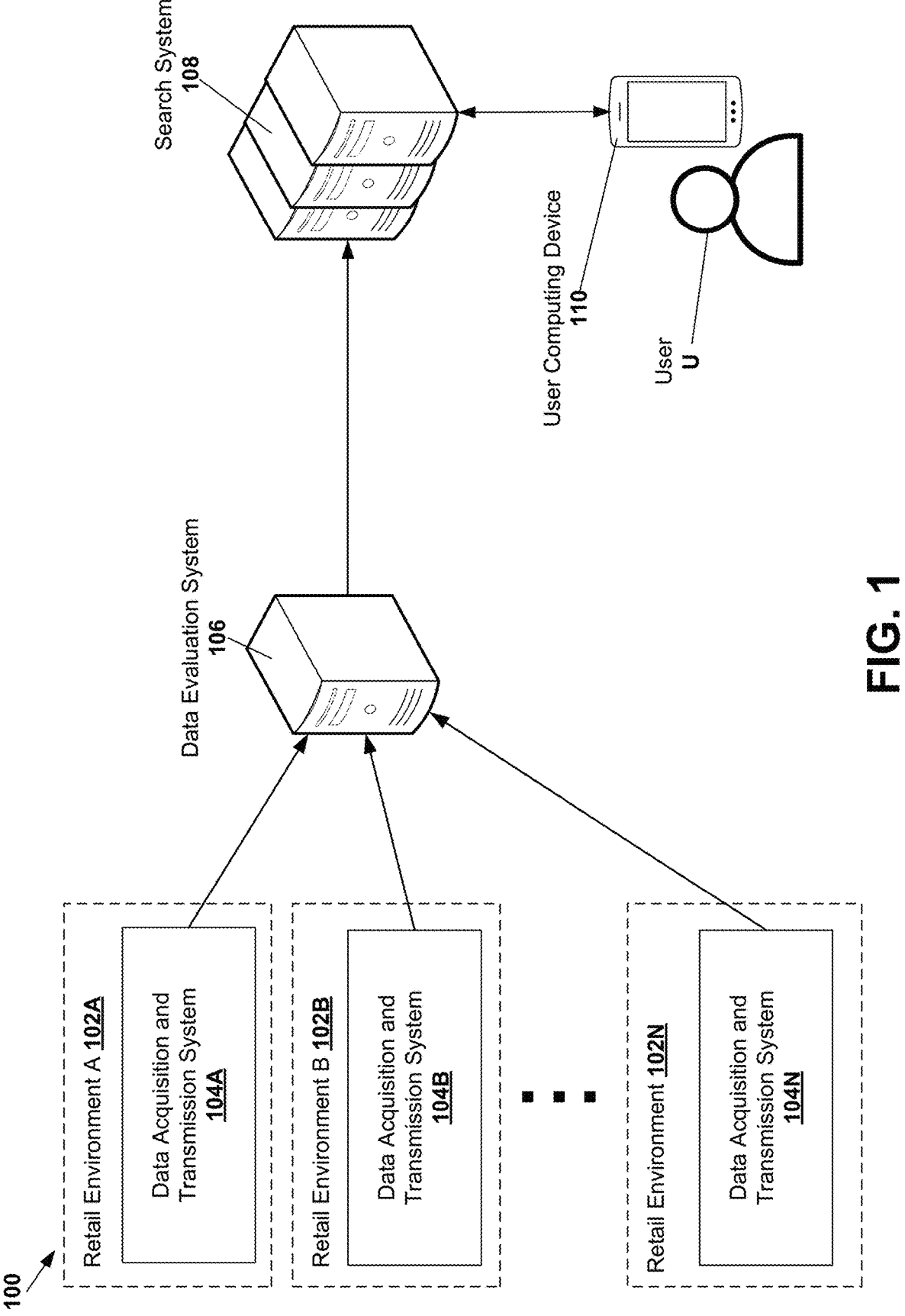
FIG. 1 is a schematic diagram illustrating an example automatic inventory monitoring and search system, in accordance with some embodiments of the present disclosure.

FIG. 1 is a schematic diagram illustrating an example automatic inventory monitoring and search system 100, in accordance with some embodiments of the present disclosure. The automatic inventory monitoring and search system 100 includes a data evaluation system connected to a plurality of data acquisition and transmission systems 104A-N each located at a corresponding retail environment 102A-N. The data evaluation system interfaces with a search system 108. The search system 108 is configured to receive search requests and provides search results to a user computing device 110. The user computing device 110 is operated by a user U.

In some embodiments, the retail environments 102A-N includes a physical store which sells one or more items. The retail environments 102A-N encompasses a wide range of settings from large department stores to small independent retailers. In some examples, a retail environment may be a small retailer that sources products from one or more vendors. In some examples, the vendor manages the automatic inventory monitoring and search system 100 with limited requirements for the retailer. For example, the systems disclosed can be integrated at a retailer where the inventory is managed by the vendor (e.g., vendor managed inventory or VIM). However, the systems and methods disclosed herein may be leveraged by retailers, manufactures, warehouses, e-commerce platforms, or other entities which desire to use automated location based inventory data. An example retail environment 102 is illustrated and described in reference to FIG. 2.

Each of the retail environments 102A-N includes a corresponding data acquisition and transmission system 104A-N. The data acquisition and transmission system 104 operate to monitor inventory for one or more items at the retailer environment. The data acquisition and transmission system is configured to automate the tracking of inventory at the item level (e.g., uniquely identifying the available inventory), where the data evaluation system can compile the item level data to track inventory for a vendor at a product level (e.g., identifying an inventory position for a product). In some embodiments, the data acquisition and transmission system is able to retrieve product identification information from tags attached to products and provides the product identification information system to the data evaluation system 106. In some embodiments, the data acquisition and transmission system 104 communicates to the data evaluation system 106 via a network, including via a Wi-Fi access point and/or a cellular network. An example data acquisition and transmission system 104 is illustrated and described in reference to FIG. 2. In some embodiments, the data acquisition and transmission system 104 is equipped with GPS technology to provide location data to the data evaluation system 106. In some embodiments, an identifier of the data acquisition and transmission system 104 is associated with a location identifier (e.g., an identifier of a specific retail store and/or address).

The data evaluation system 106 is configured to communicate with the data acquisition and transmission systems 104A-N to monitor products at the retail environments 102A-N. In some embodiments, the data evaluation system 106 comprises one or more servers. The data evaluation system 106 monitors inventory for products for one or more vendors and/or retailers across the retail environments 102A-N. In some embodiments, the data evaluation system 106 retrieves product identification information from the data acquisition and transmission systems 104A-N and uses the product identification information to determine the inventory at each of the retail environments 102A-N.

In some embodiments, the data evaluation system 106 is configured to receive the product identification information from the data acquisition and transmission system, monitor inventory of the products at the retail environments A-N, and determine a location of the inventory of the products including but not limited to via geographic identification or business identification. An example data evaluation system 106 is illustrated and described in reference to FIG. 4. In some embodiments, the data evaluation system is configured to perform the method 450 illustrated and described in reference to FIG. 5.

The search system 108 provides a search service to the user U. In some embodiments, the search service provides a user interface to the user computing device 110 which allows a user to input a search query. The search system 108 then process the search query and returns a result. In some embodiments, the search system 108 provides a listing of webpages including retailer and vendor webpages in response to a search. In some embodiments, the search system 108 provides the user interface 750 illustrated and described in reference to FIG. 8. An example search system 108 is illustrated and described in reference to FIG. 5. In some embodiments, the search system 108 is provided by a third party. For example, the search system 108 may be a search platform such as Google or Bing. In some examples, the search system 108 is a component of a social media service. In some embodiments, the search system provides a local business advertisement service. In some embodiments, the search system 108 is operated by a vendor.

In some embodiments, the search system 108 is configured to connect to the data evaluation system 106, receive the inventory of the products at a location of retail environment, receive electronic input from the user computing device 110; and provide information about, including but not limited to, the inventory of the products or the location of the products to a user U (via the user computing device 110) based upon electronic input. In some embodiments, the search system 108 generates and provides, to the user computing device 110, a user interface displaying the products alongside the inventory of the products at the location of the products.

The user computing device 110 is a computing device which allows the user to connect to a network (such as the Internet) to access the search system. Examples of the user computing device 110 include smart phones, personal computers (laptops, desktops, etc.), tablets, etc. In the example shown, the user computing device 110 is operated by the user U.

Figure 2:
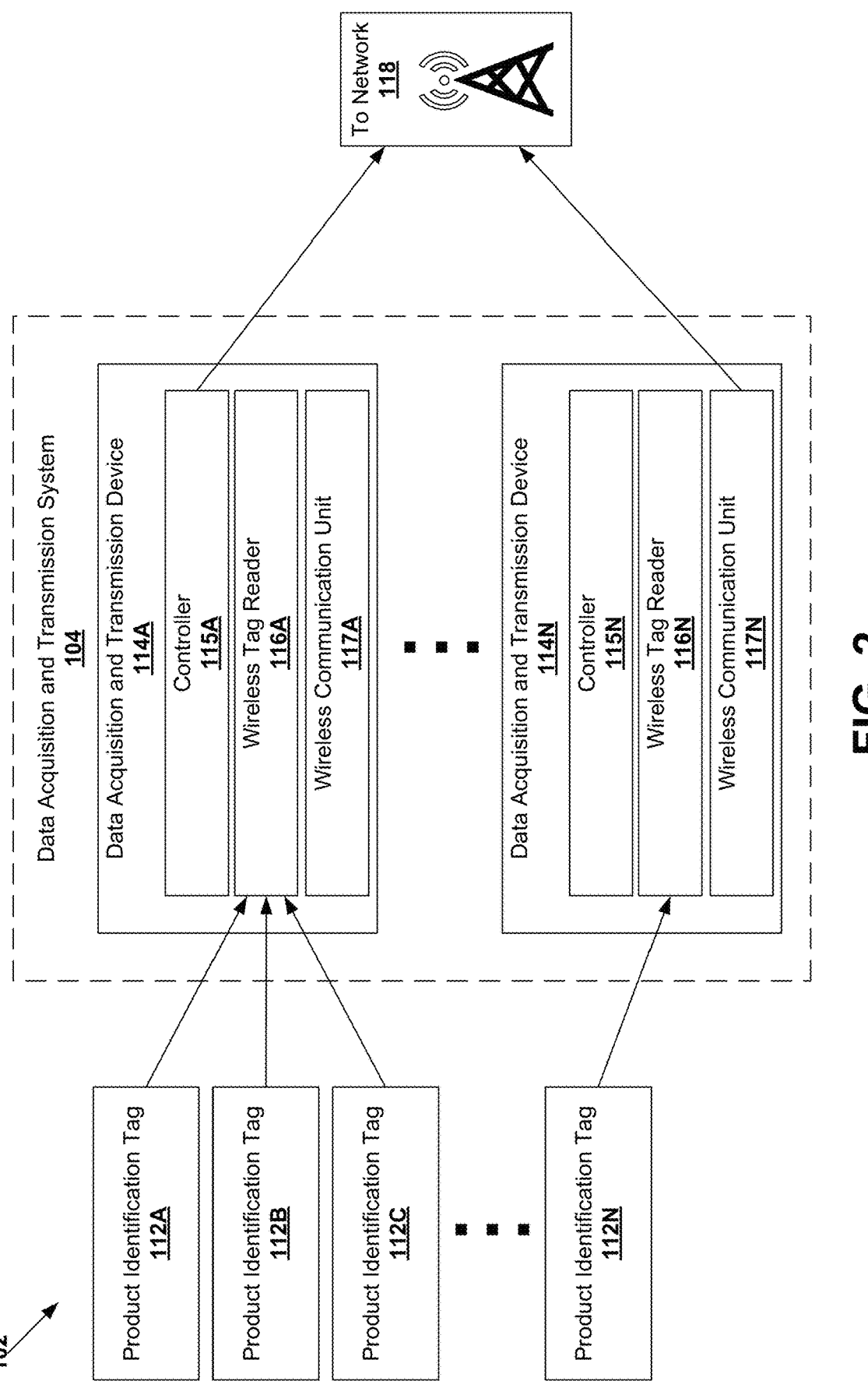
FIG. 2 is a schematic diagram illustrating an example retail environment for an automatic inventory monitoring system, in accordance with some embodiments of the present disclosure.

FIG. 2 is a schematic diagram illustrating an example retail environment 102 for an automatic inventory monitoring system, in accordance with some embodiments of the present disclosure. In the example shown, the retail environment 102 includes a data and acquisition and transmission system 104 for automatic inventory management. The retail environment 102 includes a plurality of product identification tags 112A-N each corresponding to an item and a data acquisition and transmission system 104. The data acquisition and transmission system 104 includes a plurality of data acquisition and transmission devices 114A-N. Each data acquisition and transmission devices 114A-114N includes a corresponding controller 115A-N, wireless tag reader 116A-N, and wireless communication unit 117A-N.

The product identification tags 112A-N are each associated with a product. For example, the product identification tags 112A-N can be attached or embedded with a corresponding product. In some embodiments, the product identification tags 112A-N stores and transmits an electronic product code. The product identification tag contains product identification information. In some embodiments, the product identification tags 112A-N is an electronically encoded label that is attached or embedded within a product. The product identification tag store a unique identifier that is associated with the product. In some embodiments, the product identification tags 112A-N are RFID tags. In some of these examples, the RFID tags include a passive RFID circuit. The RFID tag includes a microchip and antenna which allows for the communication of the unique identifier through radio frequency signals.

The data acquisition and transmission system 104 The data acquisition and transmission system operates to monitor the presence of one or more products associated with the product identification tags 112A-N. The data acquisition and transmission system 104 is configured to detect and provide a live inventory position (e.g., to the data evaluation system 106). The data acquisition transmission system includes a plurality of data acquisition and transmission devices 114A-N.

Each of the data acquisition and transmission devices 114A-N includes a corresponding controller 115A-N, wireless tag reader 116A-N, and a wireless communication unit 117A-N. In some embodiments, the data acquisition and transmission devices 114A-N are arranged and configured to be coupled to a product storage structure for storing products thereon. An example data acquisition and transmission device 114 is illustrated and described in reference to FIG. 3.

The controller 115A includes circuitry to operate the data acquisition and transmission device 114A. In some embodiments, the controller includes a processor and memory used for executing instructions that cause the data acquisition and transmission devices 114A-N to perform the operations herein.

The wireless tag reader 116A is operably communicating with the controller. The wireless tag readers 116A-N are configured to detect the product identification tags 112A-N. In one example, the wireless tag reader 116A uses radio frequency communication to interact with the product identification tag 112A (e.g., when the product identification tag 112A includes an RFID tag). The wireless tag reader is configured to extra a unique identifier from an RFID tag, the unique ID being a unique product ID or associated with a product ID. In some embodiments, the wireless tag reader emits radio waves that activate the RFID tag, which then responds by transmitting its unique identifier and potentially other data back to the wireless tag reader 116A.

The wireless communication unit 117A is operably communicating with the controller. The wireless communication unit is used to transmit product identification information via a wireless communication network. In some embodiments, the wireless communication network is a cellular network. In some embodiments, the wireless communication unit includes circuitry to facilitate wireless communication to the network 118.

In some embodiments, the data acquisition and transmission device 114A further comprises a first antenna switching system electrically connected by at least one electrical conductor to the wireless tag reader, the first antenna switching system having a connector interface, and a plurality of antennas electrically and removably connected by the at least one electrical conductor to the first antenna switching system at the connector interface, the plurality of antennas arranged and configured to receive the product identification information encoded in a radio frequency signal from the product identification tag when the product identification tag is within a transmission range of the plurality of antennas. In some embodiments, the data acquisition and transmission device 114A further comprises a battery power source (not shown) operable to power the data acquisition and transmission devices 114A-N.

In some embodiments, the data acquisition and transmission devices 114A-N includes a real time clock. In some of these embodiments, a time stamp is associated with the product identification information, such that the data evaluation system and/or search system are aware of the exact time the inventory position was detected.

In some embodiments, the data acquisition and transmission devices 114A-N are periodically woken up to detect product identification codes and send the product identification information to the data evaluation system 106. For example, a vendor may decide to only track an inventory position on a daily basis. After the product identification information is detected and transmitted the data acquisition and transmission devices 114A-N are placed in a power saving state the next day. Other periods can also be used or the product identification information is detected and transmitted the data acquisition and transmission devices 114A-N may operate continuously to provide a stream of real time (or near real time) product identification information.

An example of the network 118 includes a public network, such as the Internet. However, any network which allows for communication with the data evaluation system can be used.

Figure 3:
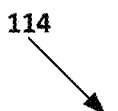
FIG. 3 is a schematic diagram illustrating an example data acquisition and transmission device, in accordance with some embodiments of the present disclosure.

FIG. 3 is a schematic diagram illustrating an example data acquisition and transmission device 114, in accordance with some embodiments of the present disclosure. The example shown includes an active antenna 124, an active sub-circuit 122, a processor 150, a memory 154, a passive or active antennas 144 and 145, a passive or active sub-circuit 142, one or more peripheral connections 160, and a plug-in expansion 170.

In the example shown, the active sub-circuit 122 includes active communication circuitry 126 and an ultra-low power synchronous trigger controller including a real time clock. In some embodiments, the active communications circuitry 126 is configured to send and receive data via long-range communications technologies using the active antenna 124. For example, the active communications circuitry 126 can implement LoRa, LTE-M, NB-IoT, etc., communications. In some embodiments, the active communications circuitry 126 and the active antenna 124, in combination, serve as an active radio transceiver for sending and receiving data via radio waves. Additionally, in some embodiments, the active communications circuitry 126 can be configured to provide geolocation, for example, by using RF location methods such as Time Difference of Arrival, cell tower triangulation, or any other appropriate method.

In some embodiments, the ultra-low power synchronous trigger controller 128 is configured to activate the active communications circuitry 126 for sending and receiving data. For example, the active sub-circuit 122 and the processor 150 can reside in a "sleep" state, e.g. an ultra-low power state, until "woken up" to send and receive data according to a schedule. The ultra-low power synchronous trigger controller 128 can be configured to "wake up," or activate, the active sub-circuit 122 and the processor 150 for sending and receiving data according to a schedule. The schedule can be periodic, for example once every 24 hours, or can be a predetermined time or set of times and dates, or can be aperiodic. In some embodiments, the schedule can be programmed into ultra-low power synchronous trigger controller 128 or the memory 154, and can be changed via instructions received at the active or passive communications using the active sub-circuit 122 or the passive or active sub-circuit 142 and stored in the ultra-low power synchronous trigger controller 128 or the memory 154. In some embodiments, the ultra-low power synchronous trigger controller 128 includes a real time clock with which to implement periodic or aperiodic scheduling of activation of the active sub-circuit 122. In general, the ultra-low power synchronous trigger controller 128 is configured to activate the active sub-circuit 122 according to a deterministic schedule.

In the example shown, the passive or active sub-circuit 142 includes the passive or active communication circuitry 146, an ultra-low power asynchronous trigger controller, and one or more sensor 155. In some embodiments, the passive or active communication circuitry 146 is configured to send and receive data via short-range or medium-range communications technologies using the passive or active antennas 144 and 145. For example, the passive or active communication circuitry 146 can implement RFID communications using the passive or active antenna 144 and/or NFC communications using the passive or active antenna 145. In some embodiments, the passive or active communication circuitry 146 and the passive or active antennas 144-145, in combination, serve as a passive or active radio transceiver for sending and receiving data via radio waves.

In the example shown, the sensors 155 include a temperature sensor 156, a humidity sensor 157, a light sensor 158, and an accelerometer 159. In some embodiments, the sensors 155 can include a connected reed switch sensor, a mechanical contact sensor or any type of appropriate sensor. The sensors 155 are communicatively coupled to the ultra-low power asynchronous trigger controller 148 and are configured to send a signal to the ultra-low power asynchronous trigger controller 148. For example, the temperature sensor 156 can send a signal to the ultra-low power asynchronous trigger controller 148 indicating a temperature, including temperature data and values, or a change in temperature; the humidity sensor 157 can send a signal to the ultra-low power asynchronous trigger controller 148 indicating a humidity, including humidity data and values, or a change in humidity; the light sensor 158 can send a signal to the ultra-low power asynchronous trigger controller 148 indicating a light level, including UV, IR, or visible light data and values, or a change in detected radiance at the sensor; and the accelerometer 159 can send a signal to the ultra-low power asynchronous trigger controller 148 indicating that the data acquisition and transmission device 114 has moved.

In some embodiments, the ultra-low power asynchronous trigger controller 148 is configured to activate the passive or active communication circuitry 146 for sending and receiving data. For example, the passive or active sub-circuit 142 and the processor 150 can reside in a "sleep" state, e.g. an ultra-low power state, until "woken up" to send and receive data according to a determined activation event. The ultra-low power asynchronous trigger controller 148 can be configured to "wake up," or activate, the passive or active sub-circuit 142 and the processor 150 for sending and receiving data upon the determination of the occurrence of an activation event.

In some embodiments, an activation event includes a signal received at either of the passive or active antennas 144 or 145 indicating a read/write or other operation by an RFID reader or an NFC device. For example, an RFID reader or NFC device can interrogate the data acquisition and transmission device 114 for identification or other data by sending radio waves received by the antennas 144 and 145. The antennas 144 and 145 convert the radio waves into an electrical signal, and transmit the electrical signal to the passive or active communication circuitry 146 which convert the electrical signal into an analog or digital electronic signal. The electronic signal can then be processed, e.g. via a programmable circuit including instructions stored in the memory 154, to determine if the electronic signal signifies an activation event, such as an interrogation by an RFID reader, or just radio wave noise or other radio wave signals not relevant to asset data communication or short-range radio communications, e.g. radio waves received by the antennas 144 and 145 that need to be filtered out and not register as an activation event.

In some embodiments, an activation event includes a signal sent by one or more of the sensors 155. For example, the accelerometer 159 can detect movement, and send an analog or digital signal that can be processed, e.g. via a programmable circuit including instructions stored in the memory 154, to determine if the electronic signifies an activation event, such as the data acquisition and transmission device 114 being moved, or if the electronic signal from the accelerometer 159 represents "noise" such as a slight movement or "bump" of the data acquisition and transmission device 114 that needs to be filtered out and not register as an activation event.

In some embodiments, the determination of whether a signal from the sensors 155 or the passive or active communication circuitry 146 is based on predetermined criteria which can be stored in the memory 154 or otherwise provided to the programmable circuit executing the instructions to make the determination. For example, the criteria can include amplitude and frequency content criteria which the programmable circuit can compare the electronic signal received by the accelerometer 159 to determine if the electronic signal represents "movement" or noise, such as a "bump," of the data acquisition and transmission device 114. As another example, the criteria can include parameters for filtering and processing of the electronic signal received from the passive or active communication circuitry 146 to determine whether the radio waves received by the antennas 144 or 145 represent relevant data or communications with a reader.

In some embodiments, the frequency of occurrence of activation events over a predetermined period of time can be determined. For example, the number of activation events resulting from signals sent by the sensors 155 and the passive or active communication circuitry 146 over a period of time, e.g. an hour or less, a day, a week, a month, a year or more, etc., can be determined, e.g. by a programmable circuit including instructions stored in the memory 154, or at the data evaluation system 106 based on data sent from data acquisition and transmission device 114.

In some embodiments, the power used by the data acquisition and transmission device 114 results from both the scheduled activation events of the ultra-low power synchronous trigger controller 128 and the activation events of the ultra-low power asynchronous trigger controller 148; e.g. both the scheduled wake-ups from the active portion and wake-ups occurring from the sensors 155 and the passive or active communication circuitry 146 from the passive or active portion. As such, in some embodiments, for example embodiments in which data acquisition and transmission device 114 is included in a wireless asset data communication tag 120 including a battery 152, the schedule and criteria can be adjusted so as to minimize the power used over time, and thereby achieve a predetermined battery life. For example, for a schedule for activating the active sub-circuit 122 can be adjusted from every 24 hours to every 48 hours to reduce the frequency of activation events occurring from the ultra-low power synchronous trigger controller 128. In the alternative, or in addition, the criteria for determining activation events from the sensors 155 or read/ write interrogations, e.g. from the passive or active communication circuitry, can be adjusted to reduce the frequency of activation events occurring from the ultra-low power asynchronous trigger controller 148. In some embodiments, limits to the frequency of activation of the passive or active sub-circuit 142 from activation signals from the ultra-low power asynchronous trigger controller 148 resulting from determined activation events can be applied in addition to, or rather than, adjusting the criteria for determining activation events from the sensors 155 or the passive or active communication circuitry 146. In some embodiments, the schedule or criteria can be adjusted to increase activation events.

In the example shown, the peripheral connections 160 include a XBee-compatible port, a Molex-compatible port, and a USB port. The peripheral connections 160 allow for host control of the data acquisition and transmission device 114. For example, the data acquisition and transmission device 114 can be directly connected to the electronics of an asset through XBee, Molex, or USB connections. In the example shown, each of the XBee, Molex, and USB ports include data, "wake" or activation, power, and general purpose input/output (GPIO) connections.

In the example shown, the data acquisition and transmission device 114 includes the plug-in expansion 170. The plug-in expansion 170 allows for circuitry to be added to the data acquisition and transmission device 114 that includes radio transceivers for other active or passive wireless communication technologies, for example, BLE, Wi-Fi, a geographic location sensor, such as a Global Positioning System (GPS) receiver, additional LoRa or cellular radios, etc., for example, by providing connections for such circuitry and radio transceivers. In some embodiments, the data acquisition and transmission device 114 can include circuitry and radio transceivers for other active or passive wireless communication technologies. In other embodiments, data acquisition and transmission device 114 can include circuitry for other active or passive wireless communication technologies and utilize any of the antennas 124, 144, and 145. In some embodiments, any circuitry and radio transceivers added to, or included in, the plug-in expansion 170 can be communicatively connected to the processor 150 or the ultra-low power asynchronous trigger controller 148 or the ultra-low power synchronous trigger controller.

Figure 4:
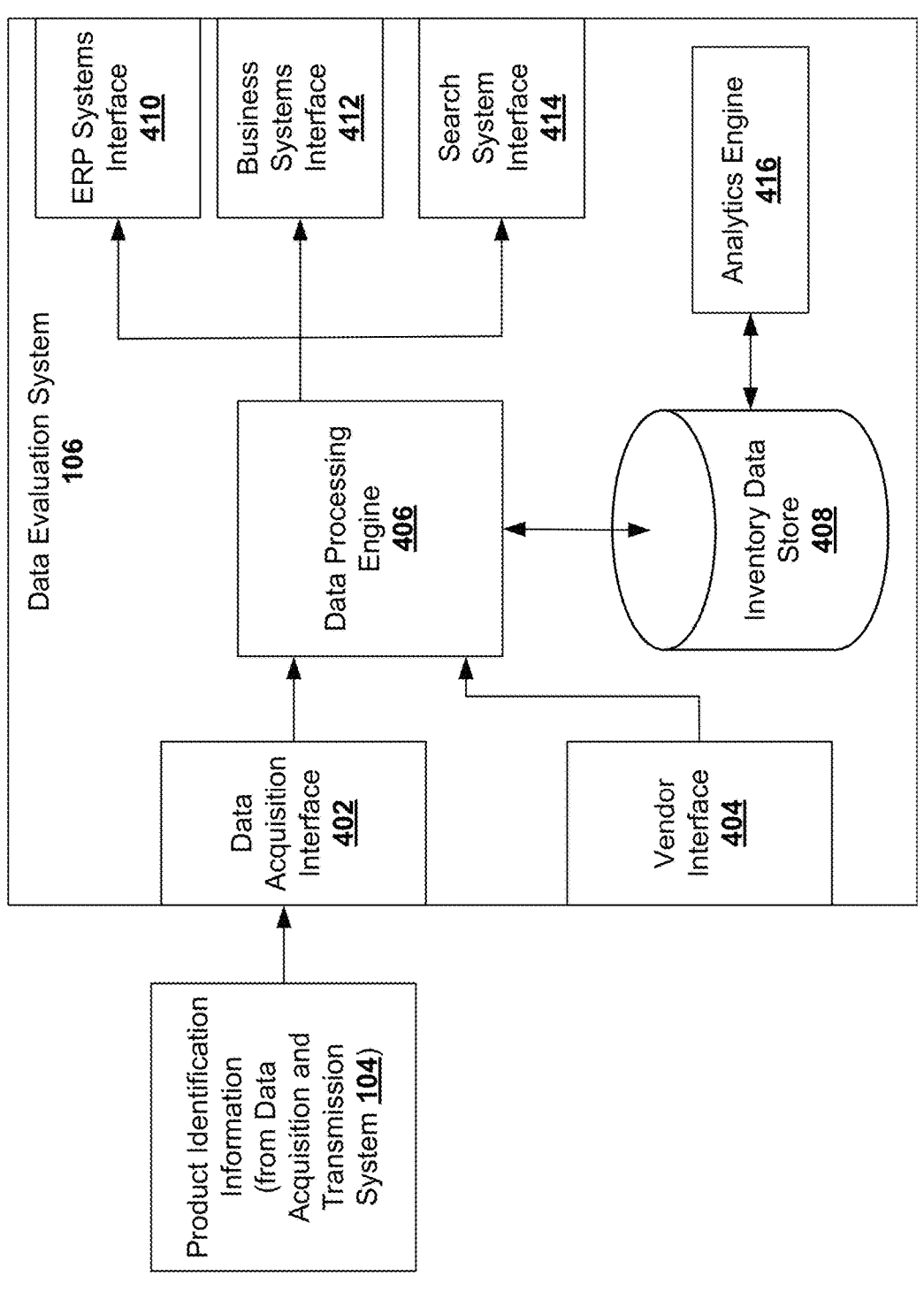
FIG. 4 is a schematic diagram illustrating an example data evaluation system, in accordance with some embodiments of the present disclosure.

FIG. 4 is a schematic diagram illustrating an example data evaluation system 106, in accordance with some embodiments of the present disclosure. The data evaluation system 106 includes a data acquisition interface 402, a vendor interface 404, a data processing engine 406, an inventory data store 408, an ERP Systems Interface 410, a business systems interface 412, a search system interface 414, and an analytics engine.

The data acquisition interface 402 receives product identification information (e.g., from the data acquisition and transmission system 104 illustrated and described in FIGS. 1 and 2). In some embodiments, the inventory data includes product identifying information, timestamps for when the information was collected, location of collection, etc. Further examples product identification information and other information provided to the data evaluation system 106 are described herein.

The vendor interface 404 allows the vendor to access the data evaluation system 106. In some embodiments, the vendor interface 404 allows the vendor to view various dashboards related to the inventory of products the vendor provides to one or more retailers. In some embodiments, the vendor interface 404 allows the vendor to supplement the product data (e.g., by uploading images and descriptions for the product).

The data processing engine 406 operates to process inventory data and structure the inventory data for the various systems including systems which access the data via the ERP systems interface 410, the business systems interface 412, the search system interface 414, and the analytics engine 416.

In some embodiments, the data processing engine 406 receives product identification information (e.g., from the data acquisition and transmission system). The product identification information may include a unique product identifier (e.g., electronic product code) and a time stamp of when the data was collected. The data processing engine 406 determines a corresponding product ID code (e.g., an SKU code) and compile the product identification information at the product level to determine an inventory position. The product identification information at the item level and/or the product level can be stored at the inventory data store 408. In some embodiments, the data processing engine 406 updates inventory data in the inventory data store 408 in response to reeving product identification information.

The inventory data store 408 is configured to store the inventory data for the data evaluation system. In some embodiments, the inventory data store 408 stores inventory data for a plurality of products of one or more vendors.

The ERP systems interface 410 interfaces with one or more enterprise resource planning (ERP) systems. For example, the ERP systems may include systems for managing a supply chain, where inventory data from the data evaluation system may be provided via the ERP systems interface 410. The ERP systems interface allows the data evaluation system to interface with ERP systems for one or more vendors or retailers.

The business systems interface 412 is configured to interface with one or more business systems, including any combination of supply chain systems, marketing systems, manufacturing systems, warehouses systems, transportation systems, etc. The business systems interface 412 allows the data evaluation system 106 to interface with various business systems for one or more vendors or retailers.

The search system interface 414 provides inventory data to the search system 108. In some embodiments, inventory data alongside product information (e.g., name, description, images of the product), store information (location) are provided to the search system via the search system interface 414. In some embodiments, the inventory data is time stamped (e.g., by the data acquisition and transmission system) and the time stamped is provided to the search system. In some embodiments, the search system may prefer and prioritize inventory data which is more recent as compared to older inventory data. For example, daily inventory data may be prioritized over weekly inventory data. Accordingly, the time stamp can be added to promote the products and/or retail stores The analytics engine 416 processes the inventory data to provide analytical insights using analytic tools and algorithms. For example, the analytics engine 416 may enable the data evaluation system to predict restocking events based on, among other factors, the inventory data stored at the inventory data store 408.

Figure 5:
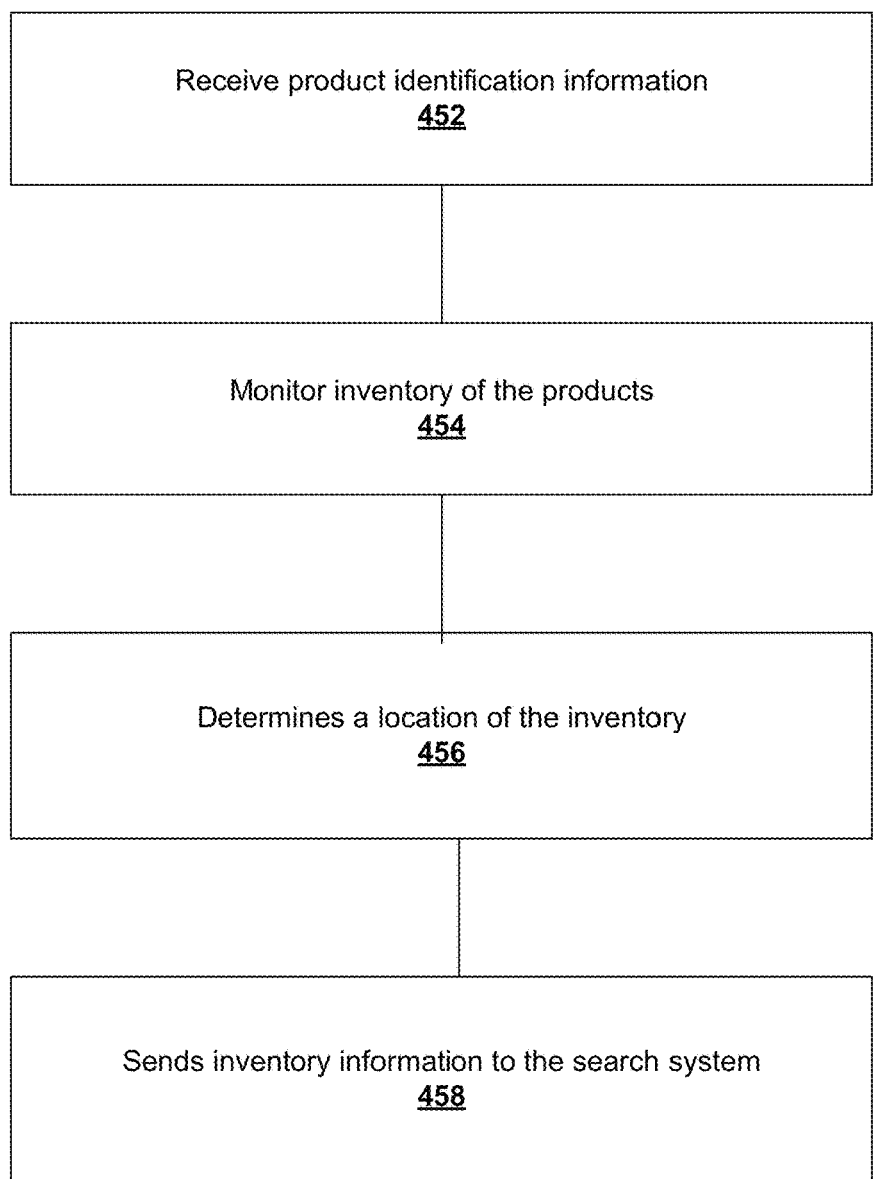
FIG. 5 illustrates an example method for providing inventory data to a search service, in accordance with some embodiments of the present disclosure.

FIG. 5 illustrates an example method 450 for providing inventory data to a search service, in accordance with some embodiments of the present disclosure. In some embodiments, the method 450 is executed at one or more serves (e.g., as part of the data evaluation system 106). In some embodiments, an inventory monitoring system includes at least one processor and at least one memory storing instructions which, when executed by the at least one processor cause the inventory monitoring system to perform the method 450. In the example shown, the method 450 includes the operations 452, 454, 456, and 458.

The operation 452 receives product identification information. The product identification information corresponds to products at a retail store. In some embodiments, the data acquisition and transmission system 104 monitors and sends the product identification information to the data evaluation system 106. The product identification information corresponds to physical products which are determined to be present in proximity to the data acquisition and transmission system (e.g., as detected via one or more wireless tag readers). In some embodiments, the product identification information received includes a unique identifier associated with each product. In some embodiments, the product identification information is received on a periodic basis (e.g., hourly, daily, weekly, monthly, etc.).

The operation 454 monitors inventory of the products. The product identification information is used to monitor the inventory of products. In some examples, the product identification information is received at an item level (e.g., via a unique ID for each item), the operation 454 convers the item level information to the product level (e.g., providing inventory numbers for each stock keeping unit (SKU)). For example, data structured indicating the available inventory of a product.

The operation 456 determines a location of the inventory. In some embodiments, the operation 456 determines a geographic identification associated with the first data acquisition and transmission device. In some embodiments, the location corresponds to a business identifier.

The operation 458 sends inventory information to the search system. In some embodiments, the inventory of the products and the location of the products are sent to a search system to allow the search system to provide information about the inventory of the products at the location of the products to a user device in response to a search request.

In some embodiments, the inventory information is optimized before it is sent to the search system. In some embodiments, the data evaluation system 106 optimizes the inventory information. In some embodiments, a separate system optimizes the inventory information. In some embodiments, the inventory information is provided to a third party which specializes in optimizing the inventory information for the search system. For example, a party with SEO optimization expertise. In some embodiments, optimizing the inventory information includes compiling the inventory of the products at a particular location with a location identifier of the search system associated with the particular location and a timestamp corresponding to when the data acquisition and transmission system detected the product identification information.

In some embodiments, the method 450 is performed automatically without input or action from a device associated with a retailer selling the products. For example, a vendor may provide a product storage device to present in the store with the data acquisition and transmission device included, where the data acquisition and transmission device connects to the data evaluation system via a cellular network.

Figure 6:
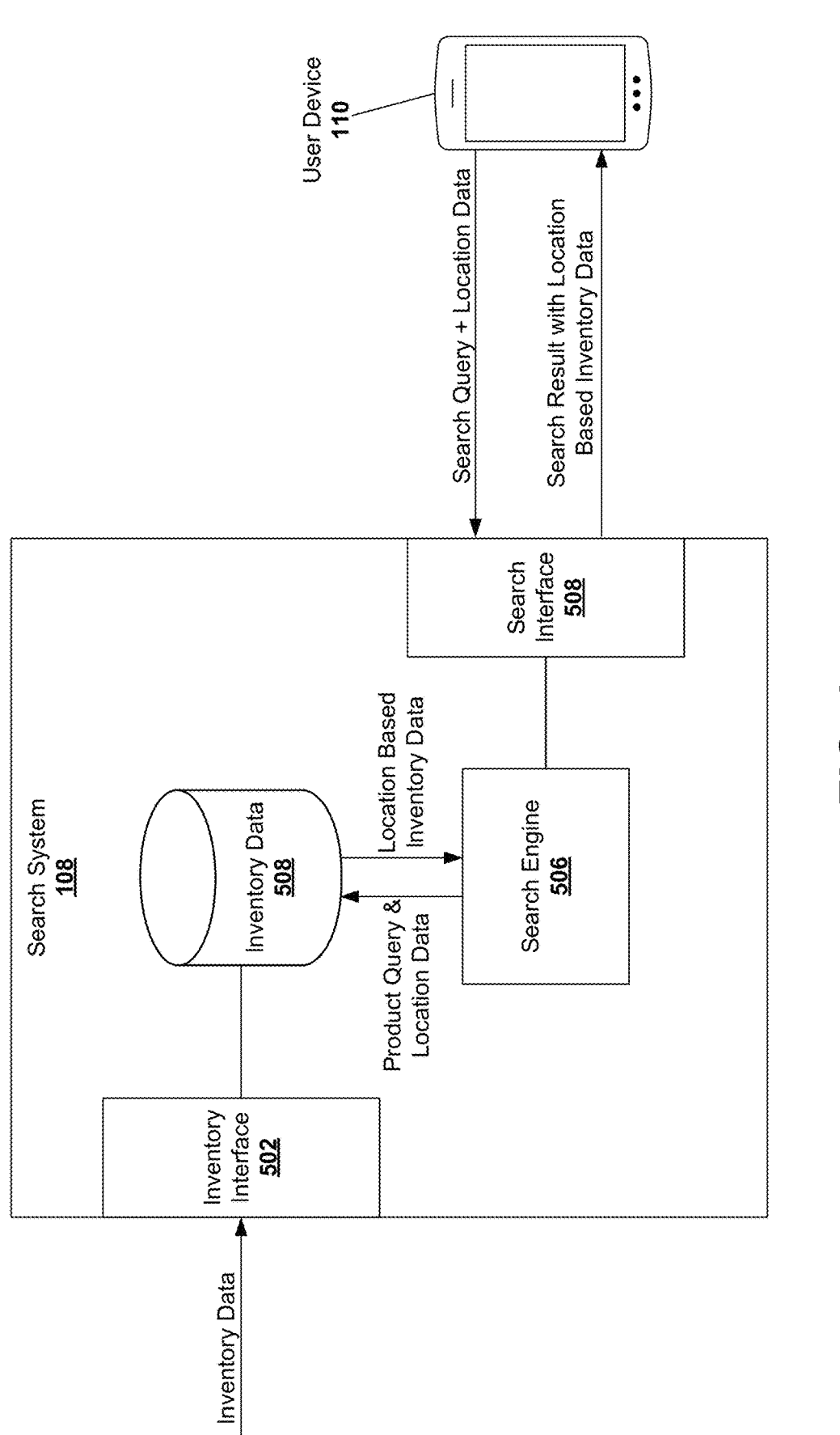
FIG. 6 is a schematic diagram illustrating an example search system, in accordance with some embodiments of the present disclosure.

FIG. 6 is a schematic diagram illustrating an example search system 108, in accordance with some embodiments of the present disclosure. In the example shown, the search system 108 includes an inventory interface 502, an inventory data store 508, a search engine 506, and a search interface 508.

The inventory interface 502 is configured to receive inventory data. In some embodiments, the inventory data is provided by the data evaluation system 106. In some embodiments, the inventory interface 502 includes an API which is configured to receive inventory data for retailers as part of an e-commerce and/or advertising service provided by the search system 108.

The inventory data store 504 stores the inventory data, such that the search engine 506 can retrieve location based inventory data in response to a product query with location data. In some examples, the product query may be for a product type (e.g., flip flop), specific product, brand, activity, etc. The location data corresponds to a location of a requesting user. In some embodiments, the location data is received from the user computing device 110. For example, the user computing device 110 can determine the user's location via GPS data, user profile data, and/or by the user entering a location (e.g., by entering a zip code into an input field).

In some embodiments, the inventory data store 508 operates with a service which removes stale inventory data (e.g., inventory data that is no longer accurate/relevant).

The search interface 508 is configured to receive search queries and location data from a plurality of user devices including the user computing device 110. In some embodiments, the search interface provides UI for receiving text searches. The search interface 508 provides the search query to the search engine 506. The search engine 506 processes the search query to provide relevant information (e.g., search results) in response to the search query. In some examples, the search engine 506 determines that location based inventory data for a product is relevant to the search query and will access the local services engine 504 for the inventory information. In some embodiments, the search engine 506 detects that a query includes text which is indicative of the user wishing to purchase a product at a physical retail location near the user. For example, if the search query includes requesting a location near them for purchasing the product (e.g., ""where can I find flip flops near me") the search engine can access the local services engine to receive inventory for the products at retail stores near the user's location. The search engine 506 will provide the search results alongside with the location based inventory data to the user computing device 110 via the search interface 508. For example as shown in the user interface 750 in FIG. 8.

FIG. 7 illustrates an example method 700 for integrating automatically inventorying monitoring with a search system, in accordance with some embodiments of the present disclosure. In some embodiments, the method 700 is performed by the data evaluation system 106, for example as shown in FIG. 1. The method 700 includes the operations 702, 704, 706, and 708.

The operation 702 receives item level data, wherein the item level data is automatically determined at a physical retail store wirelessly using a data acquisition and transmission system (e.g., the data acquisition and transmission system 104 as shown in FIG. 2). The operation 704 converts the item level data to product level data and associates the product level data with a location ID of the specific physical retail store. The operation 706 optimizing the product level data for a search service. In some embodiments the optimization includes associating the product level data with a time stamp indicating when the data was collected and linking the location ID with an identifier known by the search system (e.g., a corresponding location ID the search system knows is a specific retailer). The operation 708 provides the optimized product level data to the search service.

Figure 8:
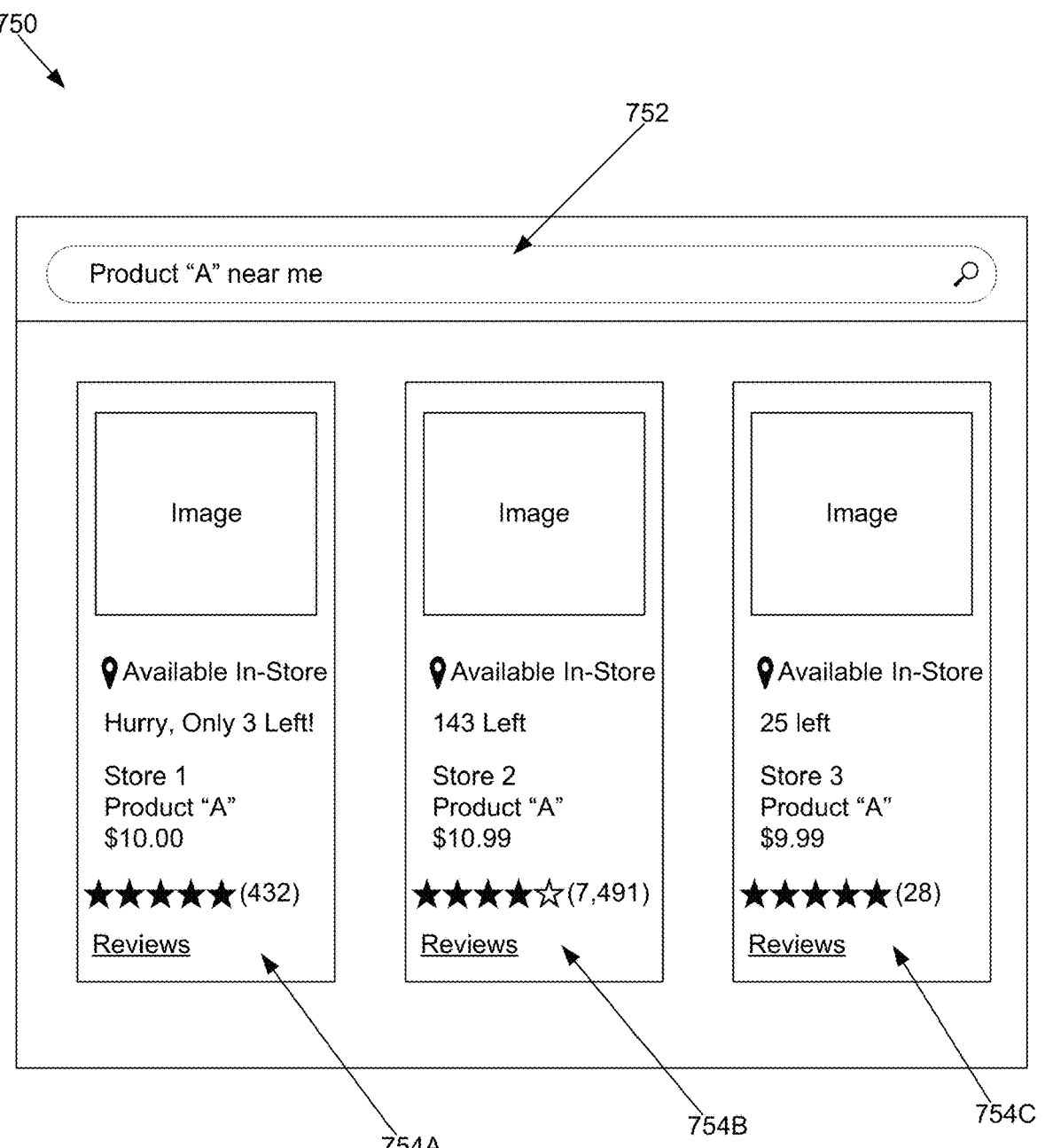
FIG. 8 illustrates a user interface provided by the search system, in accordance with some embodiments of the present disclosure.

FIG. 8 illustrates a user interface 750 provided by the search system, in accordance with some embodiments of the present disclosure. The user interface 750 includes an element 752 to receive text for a search. In the example shown, the element 752 includes an input to search for 'Product "A" near me.' Below the element 752 are cards 754A-C providing search results. Each card includes an image of the product, an indicator that the product is available in store, details for how many units of the product remain, a store name, product name, product, price, ratings for the product, and link to reviews for the product. In the example shown, the inventory information includes a specific number of remaining products at each location. In some embodiments, the inventory availability information is automatically determined and provided to the search system. For example, using the automatic inventory monitoring and search system disclosed herein.

Figure 9:
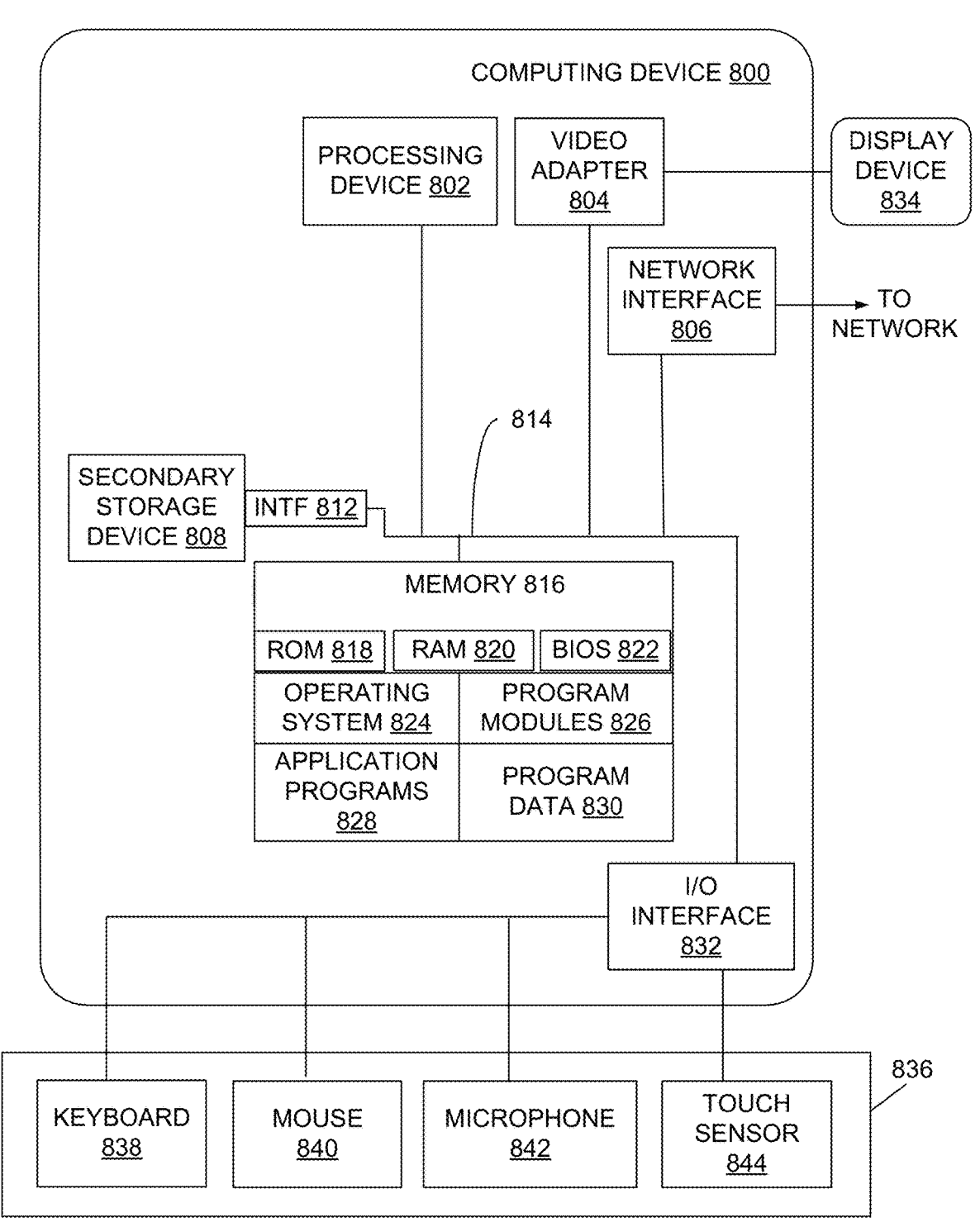
FIG. 9 illustrates an exemplary architecture of a computing device that can be used to implement aspects of the present disclosure in some embodiments.

FIG. 9 illustrates an exemplary architecture of a computing device 800 that can be used to implement aspects of the present disclosure, including any of the plurality of computing devices described herein. The computing device 800 illustrated in FIG. 9 can be used to execute the operating system, application programs, and software described herein. By way of example, the data evaluation system 106, search system 108, and the user computing device 110 (as illustrated in FIG. 1) may include some or all of the components of the computing device 800, as well as other computing components. To avoid undue repetition, this description of the computing device 800 will not be separately repeated herein for each of the computing devices, but such devices can also be configured as illustrated and described with reference to FIG. 9.

The computing device 800 includes, in some embodiments, at least one processing device 802, such as a central processing unit (CPU). A variety of processing devices are available from a variety of manufacturers, for example, Intel or Advanced Micro Devices. In this example, computing device also 800 includes a system memory 816, and a system bus 814 that couples various system components including the system memory 816 to the processing device 802. The system bus 814 is one of any number of types of bus structures including a memory bus, or memory controller; a peripheral bus; and a local bus using any of a variety of bus architectures.

The system memory 816 includes read only memory 818 and random access memory 820. A basic input/output system 822 containing the basic routines that act to transfer information within computing device 800, such as during start up, is typically stored in the read only memory 818.

The computing device 800 also includes a secondary storage device 808 in some embodiments, such as a hard disk drive, for storing digital data. The secondary storage device 808 is connected to the system bus 814 by a secondary storage interface 812. The secondary storage devices 808 and their associated computer readable media provide non-volatile storage of computer readable instructions (including application programs and program modules), data structures, and other data for the computing device 800.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 808 or system memory 816, including an operating system 824, one or more application programs 828, other program modules 826 (such as the software described herein), and program data 830. The computing device 800 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 800 through one or more input devices 836. Examples of input devices 836 include a keyboard 838, mouse 840, microphone 842, and touch sensor 844 (such as a touchpad or touch sensitive display). Other embodiments include other input devices 836. The input devices are often connected to the processing device 802 through an input/output interface 832 that is coupled to the system bus 814. These input devices 836 can be connected by any number of input/output interfaces, such as a parallel port, serial port, game port, or a universal serial bus. Wireless communication between input devices and the input/output interface 832 is possible as well, and includes infrared, BLUETOOTH® wireless technology, NFC, 802.11a/b/g/n, cellular, or other radio frequency communication systems in some possible embodiments.

In this example embodiment, a display device 834, such as a monitor, liquid crystal display device, projector, or touch sensitive display device, is also connected to the system bus 814 via an interface, such as a video adapter 804. In addition to the display device 834, the computing device 800 can include various other peripheral devices (not shown), such as speakers or a printer.

When used in a local area networking environment or a wide area networking environment (such as the Internet), the computing device 800 is typically connected to the network through a network interface 806, such as an Ethernet interface. Other possible embodiments use other communication devices. For example, some embodiments of the computing device 800 includes a modem for communicating across the network.

The computing device 800 typically includes at least some form of computer readable media. Computer readable media includes any available media that can be accessed by the computing device. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In some examples the computing device may be a desktop computer, a laptop computer, a tablet computer, a mobile computing device (such as a smart phone, an iPod® or iPad® mobile digital device, or other mobile devices), or other devices configured to process digital instructions.

The computing device 800 illustrated in FIG. 9 is also an example of programmable electronics, which can include one or more such computing devices, and when multiple computing devices are included, such computing devices can be coupled together with a suitable data communication network so as to collectively perform the various functions, methods, or operations disclosed herein.

Figure 10:
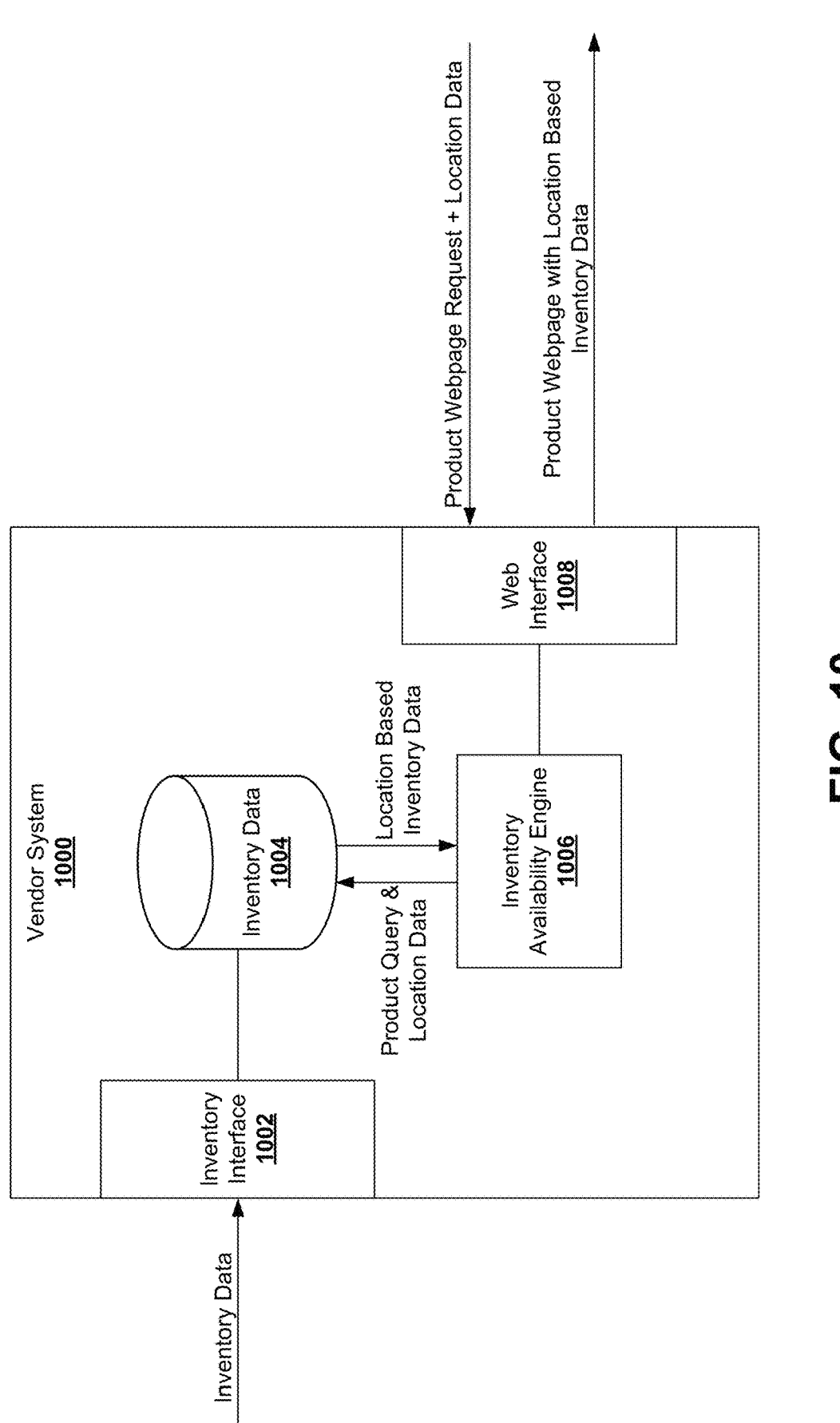
FIG. 10 is a schematic diagram illustrating a vendor system, in accordance with some embodiments of the present disclosure.

FIG. 10 is a schematic diagram illustrating a vendor system 1002, in accordance with some embodiments of the present disclosure. In some embodiments, the vendor system 1002 operates analogously to the search system 108. In the example shown, the vendor system 1002 receives inventory data from the data evaluation system 106 at an inventory interface 1002. The inventory interface 1000 may publish an API which allows various computing systems to provide inventory data. The inventory data includes one or more products that are available at one or more locations. The inventory data is stored at the inventory data store 1004. The inventory data store 1004 is configured to receive a product query with location data and in response to the query provide location based inventory data.

The vendor system 1000 is configured to receive a product webpage request and location data at a web-interface 1008. For example, a user browsing the vendors website may select a link to a product webpage. Location data for the user is received, e.g., via GPS of a computing device used by the user, by the user submitting location data at an input field, and/or by a user profile setting. The web interface provides the product identifier alongside the location data to the inventory availably engine 1006. The inventory availably engine 1006 determines what physical locations that have inventory of the requested product. In some embodiments, the inventory availability engine 1006 also determines available online inventory information.

Figure 11:
FIG. 11 illustrates an example user interface of a product webpage, in accordance with some embodiments of the present disclosure.

FIG. 11 illustrates an example user interface 1100 of a product webpage, in accordance with some embodiments of the present disclosure. The user interface 1100 is presented on a vendor website when a user selects a particular product. The user interface includes a first panel 1102 for ordering the product online. In the example shown, the first panel includes a product name, image, price, shipping information, and an add to cart selection. A second panel 1104 displays information on physical retail stores where a user can purchase the product. In the example shown, the panel 1104 includes a map with pins identifying stores that have inventory of the product. Each pin includes information about the product and the store including the store name, price, address, and availability information.

The user interfaces 750 shown in FIG. 8 and the user interface 1100 shown in FIG. 11 are for exemplary purposes. Other user interfaces providing location based inventory data are also included within the scope of this disclosure. Additionally, other systems in addition to vendor systems and search systems can also be implemented to use the location based inventory data to provide updated and accurate on-shelf inventory data to users.

The following examples are illustrated and described in further detail in the accompanying slides and drawings that further illustrate aspects of the present disclosure.

One example is an automatic inventory monitoring and search system for monitoring the presence of a product having a product identification tag associated therewith, wherein the product identification tag contains product identification information, wherein the automatic inventory monitoring and search system comprises: a first data acquisition and transmission device arranged and configured to be coupled to a product storage structure for storing products thereon, the first data acquisition and transmission device comprising: a control subsystem; a wireless tag reader subsystem operably communicating with the control subsystem; and a wireless communications subsystem operably communicating with the control subsystem, wherein the wireless communications subsystem transmits the product identification information via a wireless communication network; a data evaluation subsystem arranged and configured to: receive the product identification information from the wireless communications subsystem of the first data acquisition and transmission device; monitor inventory of the products at the product storage structure; and locate the inventory including but not limited to via geographic identification or business identification; and a user search subsystem arranged and configured to: connect via a network to the data evaluation subsystem; receive an inventory of products from the data evaluation subsystem; receive the location of the products from the data evaluation subsystem; receive electronic input from a user; and display information about including but not limited to the inventory of products or the location of the products to a user based upon electronic input.

Another example is an automatic inventory monitoring and search system for monitoring the presence of a product having a product identification tag associated therewith, wherein the product identification tag contains product identification information, wherein the inventory monitoring system comprises: a first data acquisition and transmission device arranged and configured to be coupled to a product storage structure for storing products thereon, the first data acquisition and transmission device comprising: a battery power source operable to power the first data acquisition and transmission device; a control subsystem; a real time clock; a wireless tag reader subsystem operably communicating with the control subsystem; a first antenna switching subsystem electrically connected by at least one electrical conductor to the wireless tag reader subsystem, the first antenna switching subsystem having a connector interface; a plurality of antennas electrically and removably connected by at least one electrical conductor to the first antenna switching subsystem at the connector interface, the plurality of antennas arranged and configured to receive the product identification information encoded in a radio frequency signal from the product identification tag when the product identification tag is within a transmission range of the antennas; and a wireless communications subsystem operably communicating with the control subsystem, wherein the wireless communications subsystem transmits the product identification information via a wireless communication network; a data evaluation subsystem arranged and configured to: receive the product identification information from the wireless communications subsystem of the first data acquisition and transmission device; monitor inventory of the products at the product storage structure; and locate the inventory including but not limited to via geographic identification or business identification; a user search subsystem arranged and configured to: connect via a network to the data evaluation subsystem; receive an inventory of products from the data evaluation subsystem; receive the location of the products from the data evaluation subsystem; receive electronic input from a user; and display information about including but not limited to the inventory of products or the location of the products to the user based upon electronic input.

A further example is an automatic inventory monitoring and search system for monitoring the presence of a product having a product identification tag associated therewith, wherein the product identification tag contains product identification information, wherein the automatic inventory monitoring and search system comprises: a first data acquisition and transmission device arranged and configured to be coupled to a product storage structure for storing products thereon, the first data acquisition and transmission device comprising: a control subsystem; a wireless tag reader subsystem operably communicating with the control subsystem; and a wireless communications subsystem operably communicating with the control subsystem, wherein the wireless communications subsystem transmits the product identification information via a wireless communication network; and a data evaluation subsystem arranged and configured to: receive the product identification information from the wireless communications subsystem of the first data acquisition and transmission device; monitor inventory of the products at the product storage structure; locate the inventory including but not limited to via geographic identification or business identification; connect via a network to a user search subsystem; and send the inventory of the products and the locations of the products to the user search subsystem to cause the user search subsystem to display information about the inventory of products and/or the location of the products to a user.

Another example is an automatic inventory monitoring and search system for monitoring the presence of a product having a product identification tag associated therewith, wherein the product identification tag contains product identification information, wherein the automatic inventory monitoring and search system comprises: a user search subsystem arranged and configured to: connect via a network to a data evaluation subsystem; receive an inventory of products from the data evaluation subsystem; receive the location of each of products from the data evaluation subsystem; receive electronic input from a user; and display information about including but not limited to the inventory of products or the location of each of products to a user based upon electronic input.

In this example, the automatic inventory monitoring and search system can further include a first data acquisition and transmission device arranged and configured to be coupled to a product storage structure for storing products thereon, the first data acquisition and transmission device comprising: a control subsystem; a wireless tag reader subsystem operably communicating with the control subsystem; and a wireless communications subsystem operably communicating with the control subsystem, wherein the wireless communications subsystem transmits the product identification information via a wireless communication network.

In this example, the automatic inventory monitoring and search system can further include, wherein the data evaluation subsystem is arranged and configured to: receive the product identification information from the wireless communications subsystem of the first data acquisition and transmission device; monitor inventory of the products at the product storage structure; and locate the inventory including but not limited to via geographic identification or business identification.

Another example is an automatic inventory monitoring and search system comprising: a data acquisition and transmission device; a data evaluation subsystem; and a user search subsystem.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An automatic inventory monitoring and search system for monitoring presence of a product having a product identification tag associated therewith, wherein the product identification tag contains product identification information, wherein the automatic inventory monitoring and search system comprises:

a first data acquisition and transmission device arranged and configured to be coupled to a product storage structure for storing products thereon, the first data acquisition and transmission device comprising:
a controller;
a wireless tag reader operably communicating with the controller; and
a wireless communications unit operably communicating with the controller, wherein the wireless communications unit transmits the product identification information via a wireless communication network;

a data evaluation system configured to:
receive the product identification information from the wireless communications unit of the first data acquisition and transmission device;
determine a location of the products, the location represented by a store identifier;
compile an inventory of the products, the inventory comprising:
the product identification information;
one or more timestamps corresponding to times at which the first data acquisition and transmission device detected the product identification information; and
the location of the products; and a search system configured to:
connect to the data evaluation system;
receive the inventory of the products at the location;
receive electronic input from a user computing device;
prioritize the inventory based on recency according to the one or more timestamps of the inventory;
remove stale data from the inventory; and
provide information about the inventory of the products at the location of the products to the user computing device based upon the electronic input.

2. The automatic inventory monitoring and search system of claim 1, wherein the product identification tag is an RFID tag.

3. The automatic inventory monitoring and search system of claim 1, wherein the wireless communication network is a cellular network.

4. The automatic inventory monitoring and search system of claim 1, wherein the first data acquisition and transmission device further comprises:

a first antenna switching system electrically connected by at least one electrical conductor to the wireless tag reader, the first antenna switching system having a connector interface; and a plurality of antennas electrically and removably connected by the at least one electrical conductor to the first antenna switching system at the connector interface, the plurality of antennas arranged and configured to receive the product identification information encoded in a radio frequency signal from the product identification tag when the product identification tag is within a transmission range of the plurality of antennas.

5. The automatic inventory monitoring and search system of claim 1, wherein the first data acquisition and transmission device further comprises a battery power source operable to power the first data acquisition and transmission device.

6. The automatic inventory monitoring and search system of claim 1, wherein the first data acquisition and transmission device further comprises a real time clock.

7. The automatic inventory monitoring and search system of claim 1, wherein the automatic inventory monitoring and search system comprises a plurality of data acquisition and transmission devices including the first data acquisition and transmission device.

8. The automatic inventory monitoring and search system of claim 1, wherein the data evaluation system comprises one or more servers.

9. The automatic inventory monitoring and search system of claim 1, wherein the search system generates and provides, to the user computing device, a user interface displaying the products alongside the inventory of the products at the location of the products.

* * * * *